(12) United States Patent
Guen (10) Patent No.: US 11,108,095 B2
(45) Date of Patent: Aug. 31, 2021

(54) SECONDARY BATTERY (71) Applicant: Samsung SDI Co., Ltd., Yongin-si (KR)

(72) Inventor: Min Hyung Guen, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 216 days.

(21) Appl. No.: 16/573,793

(22) Filed: Sep. 17, 2019

(65) Prior Publication Data
US 2020/0091570 A1 Mar. 19, 2020

(30) Foreign Application Priority Data

Sep. 19, 2018 (KR) .................. 10-2018-0112322

(51) Int. Cl.
*H01M 10/48* (2006.01)
*H01M 50/147* (2021.01)
*H01M 50/543* (2021.01)

(52) U.S. Cl.
CPC ....... *H01M 10/488* (2013.01); *H01M 50/147* (2021.01); *H01M 50/543* (2021.01); *H01M 2200/20* (2013.01)

(58) Field of Classification Search
CPC ...................... H01M 10/488; H01M 50/325
See application file for complete search history.

(56) References Cited

U.S. PATENT DOCUMENTS

| 8,771,854 B2 | 7/2014 | Guen et al. |
| 2012/0183817 A1 | 7/2012 | Guen et al. |
| 2018/0358648 A1 | 12/2018 | Guen |

FOREIGN PATENT DOCUMENTS

| DE | 102014006343 | * | 12/2015 |
| DE | 102014006343 A1 | * | 12/2015 |
| KR | 10-1222376 | | 1/2013 |
| KR | 10-2018-0131798 | | 12/2018 |
| KR | 10-2018-0135594 | | 12/2018 |

* cited by examiner

*Primary Examiner* — Ula C Ruddock
*Assistant Examiner* — Thomas H. Parsons
(74) *Attorney, Agent, or Firm* — Lewis Roca Rothgerber Christie LLP (57) ABSTRACT

A secondary battery includes: a case including an internal receiving space and having an opening; an electrode assembly accommodated in the internal receiving space of the case; a cap plate coupled to the opening of the case; and a terminal coupled to the cap plate and electrically connected to the electrode assembly, and the terminal includes a terminal region integrally formed with the cap plate, a membrane on a bottom surface of the terminal region and being downwardly convex, and a pressure indicator pin on a top surface of the membrane.

11 Claims, 6 Drawing Sheets

SECONDARY BATTERY

CROSS-REFERENCE TO RELATED APPLICATION

This application claims priority to and the benefit of Korean Patent Application No. 10-2018-0112322, filed on Sep. 19, 2018 in the Korean Intellectual Property Office, the entire content of which is herein incorporated by reference.

BACKGROUND

1. Field

Aspects of embodiments of the present invention relate to a secondary battery.

2. Description of the Related Art

A secondary battery is a power storage system which can provide an excellent energy density for converting electrical energy into chemical energy and storing the same. Unlike primary batteries, which cannot be recharged, secondary batteries are rechargeable and are widely used in IT devices, such as smartphones, cellular phones, notebook computers, tablet PCs, or the like. Recently, in order to prevent environmental pollution, electric vehicles have attracted attention and high-capacity secondary batteries are being employed to the electric vehicles accordingly. Such secondary batteries need to have various advantageous features, including high energy density, high power output, and stability.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a secondary battery is provided, which can visually identify whether or not the internal pressure of the secondary battery is increased according to protrusion of a pressure indicator pin.

According to one or more embodiments of the present invention, a secondary battery includes: a case including an internal receiving space and having an opening; an electrode assembly accommodated in the internal receiving space of the case; a cap plate coupled to the opening of the case; and a terminal coupled to the cap plate and electrically connected to the electrode assembly, wherein the terminal includes a terminal region integrally formed with the cap plate, a membrane on a bottom surface of the terminal region and being downwardly convex, and a pressure indicator pin on a top surface of the membrane.

A cavity may be located at a lower portion of the terminal region, the membrane and the pressure indicator pin may be arranged in the cavity, and the membrane may include a downwardly convex round part, and an edge part located along an outer periphery of the round part and fixed to a bottom surface of the terminal region in the cavity.

The round part of the membrane may be configured to come into contact with the bottom surface of the terminal region to allow the pressure indicator pin to protrude to a top surface of the terminal region when the internal pressure of the case is increased.

The pressure indicator pin may be vertically mounted at a center of the membrane and may be shaped as a vertically extending pin having a thickness.

The pressure indicator pin may include a top end passing through the terminal region to be outwardly exposed.

The pressure indicator pin may include a surface having a color that is different from a color of the cap plate and has high visibility.

The cap plate may have a thickness from approximately 1.5 mm to approximately 2.5 mm, and the terminal region may have a thickness from approximately 2 mm to approximately 2.5 mm.

The terminal region may have a thickness equal to or greater than a thickness of the cap plate.

A thickness difference between the terminal region and the cap plate may be less than 0.5 mm.

The terminal may further include a collector plate electrically connecting the electrode assembly and the bottom surface of the terminal region, the collector plate may be mounted on a side of the bottom surface of the terminal region, and the membrane may be mounted on another side of the bottom surface of the terminal region.

The terminal region may include a position identification groove extending downwardly from a top surface of the terminal region, and the pressure indicator pin may be exposed through a center of the position identification groove.

As described above, the secondary battery according to embodiments of the present invention can provide visual identification of whether or not the internal pressure of the secondary battery is increased according to the protrusion of a pressure indicator pin.

DETAILED DESCRIPTION

Herein, some example embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, it is to be understood that when an element A is referred to as being "connected to" an element B, the element A may be directly connected to the element B or one or more intervening elements C may be present and the element A and the element B may be indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

When a certain embodiment may be implemented differently, a specific process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
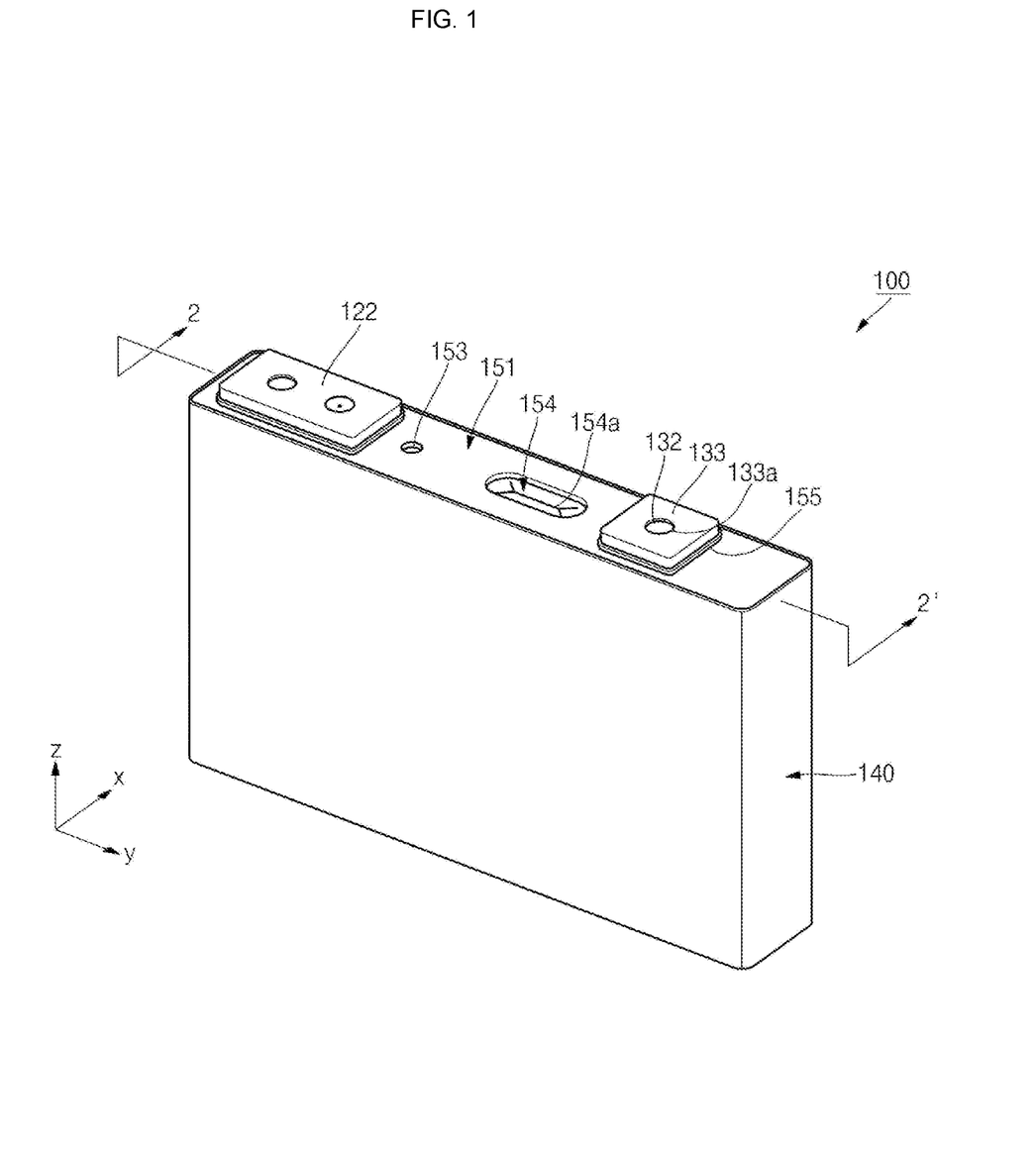
FIG. 1 is a perspective view of a secondary battery according to an embodiment of the present invention.
Figure 2:
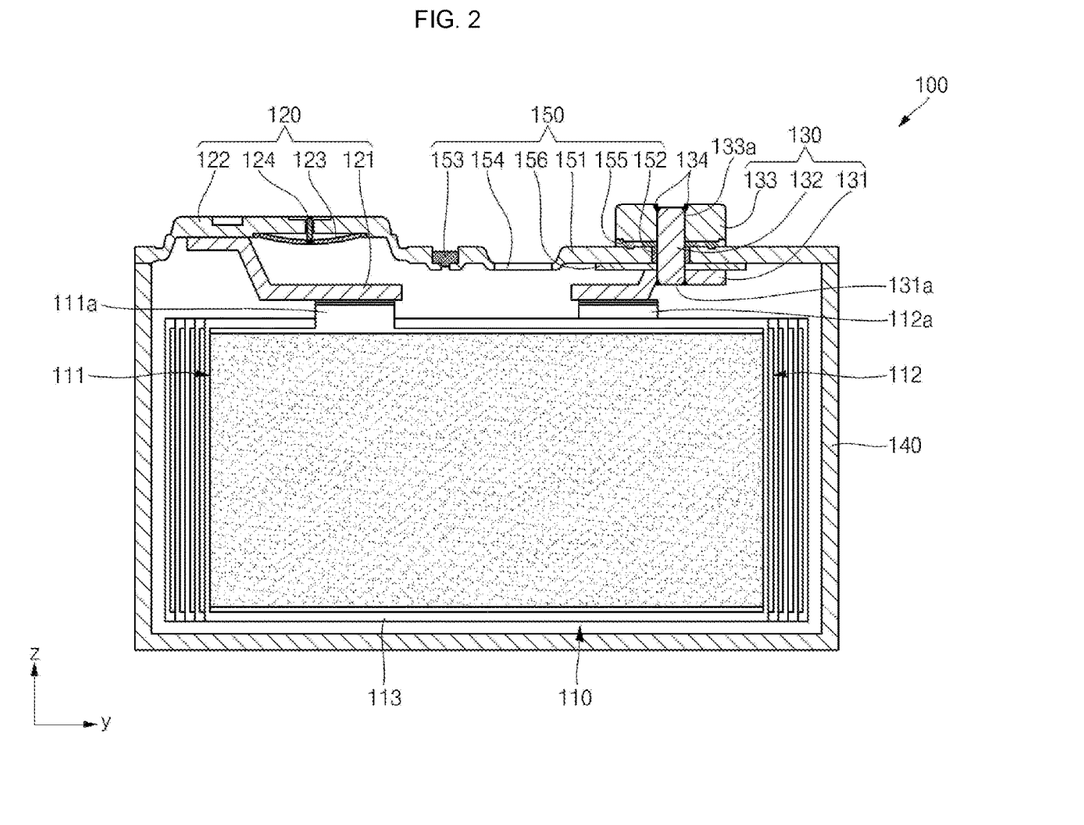
FIG. 2 is a cross-sectional view of the secondary battery shown in FIG. 1, taken along the line 2-2'.

FIG. 1 is a perspective view of a secondary battery according to an embodiment of the present invention; FIG. 2 is a cross-sectional view of the secondary battery shown in FIG. 1, taken along the line 2-2'; and FIG. 3 is an exploded perspective view of the secondary battery shown in FIG. 1.

Figure 3:
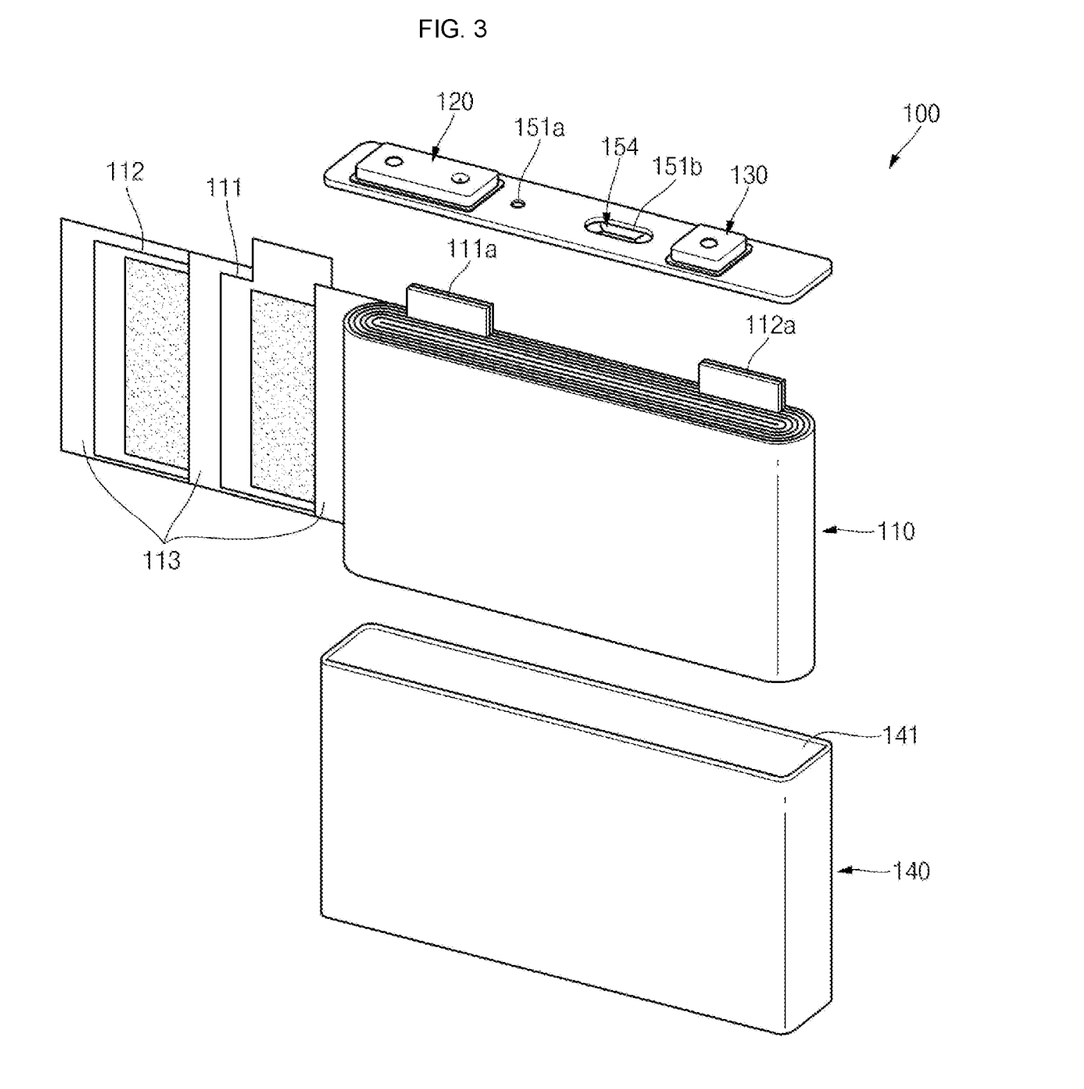
FIG. 3 is an exploded perspective view of the secondary battery shown in FIG. 1.

As shown in FIGS. 1 to 3, a secondary battery 100 according to an embodiment of the present invention includes an electrode assembly 110, a first terminal 120, a second terminal 130, a case 140, and a cap assembly 150. Here, the cap assembly 150 may include a cap plate 151 sealing a top opening 141 of the case 140.

The electrode assembly 110 is formed by winding or stacking a stacked structure including a first electrode plate 111, a separator 113, and a second electrode plate 112, which are shaped of thin plates or layers. In an embodiment, the first electrode plate 111 may serve as a positive electrode, and the second electrode plate 112 may serve as a negative electrode. In another embodiment, polarities of the first electrode plate 111 and the second electrode plate 112 may be reversed.

The first electrode plate 111 is formed by coating a first electrode active material, such as a transition metal oxide, on a first electrode collector made of a metal foil, such as aluminum, and includes a first electrode uncoated portion 111a on which the first electrode active material is not coated. The first electrode uncoated portion 111a may function as a current flow passage between the first electrode plate 111 and the outside of the first electrode plate 111. In an embodiment, the first electrode uncoated portion 111a may be located for each turn of the wound electrode assembly 110 and may upwardly protrude by a length (e.g., a predetermined length) from the electrode assembly 110. In an embodiment, the first electrode uncoated portion 111a may include multiple first electrode uncoated portions and may be provided at a side (e.g., the left side) of the top end of the electrode assembly 110. The material of the first electrode plate 111 is not limited to those listed herein.

The second electrode plate 112 is formed by coating a second electrode active material, such as graphite or carbon, on a second electrode collector made of a metal foil, such as copper or nickel, and includes a second electrode uncoated portion 112a on which the second electrode active material is not coated. The second electrode uncoated portion 112a may function as a current flow passage between the second electrode plate 112 and the outside of the second electrode plate 112. In an embodiment, the second electrode uncoated portion 112a may be located for each turn of the wound electrode assembly 110 and may upwardly protrude by a length (e.g., a predetermined length) from the electrode assembly 110. In an embodiment, the second electrode uncoated portion 112a may include multiple second electrode uncoated portions and may be provided at another side (e.g., the right side) of the top end of the electrode assembly 110. The material of the second electrode plate 112 is not limited to those listed herein.

The separator 113 may prevent or substantially prevent an electric short between the first electrode plate 111 and the second electrode plate 112 and may allow lithium ions to move. The separator 113 may be made of, for example, polyethylene (PE), polypropylene (PP), or a composite film of polyethylene (PE) and polypropylene (PP). However, the material of the separator 113 is not limited to those listed herein.

The first terminal 120 and the second terminal 130 electrically connected to the first electrode uncoated portion 111a of the first electrode plate 111 and the second electrode uncoated portion 112a of the second electrode plate 112, respectively, are positioned at the left and right sides of the top end of the electrode assembly 110.

In an embodiment, a winding axis of the electrode assembly 110 is substantially parallel or substantially horizontal with a terminal axis of the first terminal 120 and the second terminal 130. Here, the winding axis or the terminal axis refers to a vertical axis extending in a top-bottom direction, and it is to be understood that when a winding axis is referred to as being substantially parallel or horizontal with a terminal axis, the winding axis and the terminal axis may not meet each other even when they are elongated or may meet each other only when they are elongated by a large distance.

As described above, in an embodiment, the winding axis of the electrode assembly 110 and the terminal axis of each of the first and second terminals 120 and 130 are substantially parallel or horizontal with each other. Therefore, when the electrolyte is injected, the electrode assembly 110 may demonstrate high electrolyte impregnating efficiency.

The electrode assembly 110 is accommodated in the case 140 along with an electrolyte. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as lithium hexafluorophosphate ($LiPF_6$) or lithium tetrafluoroborate ($LiBF_4$). In addition, the electrolyte may be in a liquid, solid, or gel phase.

The first terminal 120 is made of a metal and is electrically connected to the first electrode uncoated portion 111a of the first electrode plate 111. The first terminal 120 includes a first collector plate 121, a terminal region 122, a membrane 123, and a pressure indicator pin 124.

Figure 4:
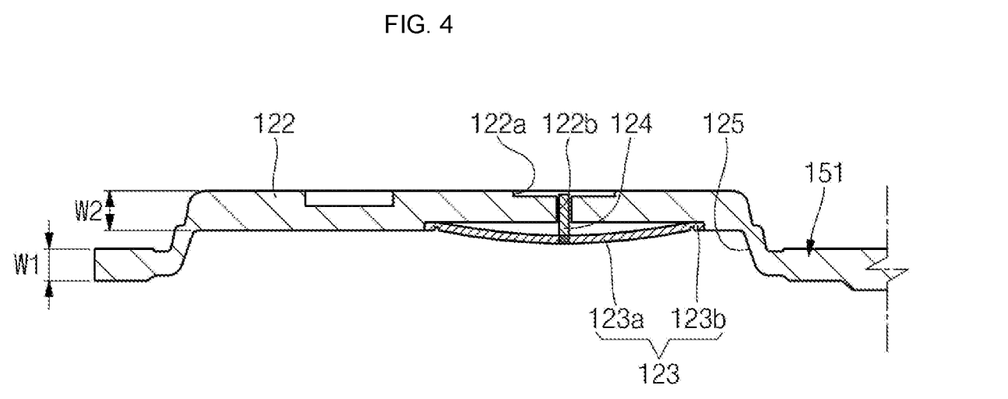
FIG. 4 is an enlarged cross-sectional view illustrating a terminal region of the secondary battery shown in FIG. 2.

FIG. 4 is an enlarged cross-sectional view illustrating the terminal region 122, the membrane 123, and the pressure indicator pin 124 of the secondary battery 100 shown in FIG. 2. The first terminal 120 will now be described with reference to FIG. 4.

The first collector plate 121 has a side brought into contact with and welded to a bottom portion of the terminal region 122 and another side brought into contact with and welded to the first electrode uncoated portion 111a of the first electrode plate 111. In an embodiment, the first collector plate 121 includes at least one bent portion between the sides to be configured to have a stepped portion. Here, the another side of the first collector plate 121, which is brought into contact with the first electrode uncoated portion 111a, may be positioned lower than the side of the first collector plate 121, which is brought into contact with and welded to a bottom portion of the terminal region 122. The first collector plate 121 may be made of, for example, aluminum or an aluminum alloy, but a material of the first collector plate 121 is not limited to thereto.

In an embodiment, the terminal region 122 may upwardly protrude from the cap plate 151. For example, the terminal region 122 may be formed using a forging process when the cap plate 151 is formed and may be integrally formed with the cap plate 151. In an embodiment, a thickness W2 of the terminal region 122 may be equal to or greater than a thickness W1 of the cap plate 151.

Absolute thicknesses of the cap plate 151 and the terminal region 122 may vary in various manners according to a size, capacity, characteristics, or a user's needs. However, in a secondary battery for use in an automobile or an energy storage system (ESS), in an embodiment, the thickness W1 of the cap plate 151 may be in a range from approximately 1.5 mm to approximately 2.5 mm, and the thickness W2 of the terminal region 122 may be in a range from approximately 2 mm to approximately 2.5 mm. In an embodiment, if the thickness W2 of the terminal region 122 is greater than the thickness W1 of the cap plate 151, a thickness difference may be less than 0.5 mm. In an embodiment, the thickness W2 of the terminal region 122 may be equal to the thickness W1 of the cap plate 151. For example, the cap plate 151 may form the terminal region 122 on a metal plate having a same thickness with the cap plate 151 using a forging process. Here, the thickness W2 of the terminal region 122 may be equal to the thickness W1 of the cap plate 151. In addition, since the terminal region 122 may be formed by performing the forging process on the cap plate 151, a cavity 125 may be provided in a lower region of the cap plate 151, and the first collector plate 121, the membrane 123, and the pressure indicator pin 124 may be mounted in the cavity 125.

A side of the first collector plate 121 may be brought into contact with and welded to a side of the bottom surface of the terminal region 122. In addition, the membrane 123 may be installed on another side of the bottom surface of the terminal region 122. The membrane 123 may include a downwardly convex round part 123a and an edge part 123b fixed to the bottom surface of the terminal region 122. The edge part 123b of the membrane 123 may be brought into contact with and adhered to the bottom surface of the terminal region 122. The membrane 123 may be a circular plate made of a downwardly convex thin film. If the internal pressure of the case 140 rises to exceed a reference pressure, the round part 123a of the membrane 123 upwardly moves to be brought into contact with the bottom surface of the terminal region 122.

In addition, the pressure indicator pin 124 may be vertically installed approximately at a center of the membrane 123. In an embodiment, the pressure indicator pin 124 may be shaped of a vertically extending pin having a constant thickness. In addition, a top end of the pressure indicator pin 124 may be exposed to the exterior side of the cap plate 151 through a pin hole 122b passing through top and bottom surfaces of the terminal region 122. If the round part 123a of the membrane 123 upwardly moves, the pressure indicator pin 124 may protrude to an upper portion of the cap plate 151. In an embodiment, in order to view whether the pressure indicator pin 124 protrudes to the upper portion of the cap plate 151, the pressure indicator pin 124 may have a surface having a color that is different from that of the cap plate 151 and may have high visibility. For example, the surface of the pressure indicator pin 124 may be colored a primary color having good visibility, such as red or yellow, but the color of the pressure indicator pin 124 is not limited thereto.

In an embodiment, the top surface of the terminal region 122 may be coplanar with a top surface of a terminal plate 133 of the second terminal 130. That is, a height of the terminal region 122 may be equal to that of the terminal plate 133 of the second terminal 130. In an embodiment, the terminal region 122 may have a larger size in a lengthwise direction (y) of the cap plate 151 than that of the terminal plate 133 of the second terminal 130 in the lengthwise direction (y), such that the membrane 123 and the pressure indicator pin 124 may be arranged on the bottom portion of the terminal region 122.

In an embodiment, the terminal region 122 may include a position identification groove 122a extending downwardly from a top surface of the terminal region. In an embodiment, the pressure indicator pin 124 is exposed approximately at a center of the position identification groove 122a. For example, the position identification groove 122a may be a groove for identifying a welding position of a bus bar (not shown) when the terminal region 122 is welded to the bus bar.

In an embodiment, the terminal region 122 may be made of a same material as the cap plate 151, e.g., aluminum or an aluminum alloy, and may be easily welded to a bus bar (not shown) made of aluminum or an aluminum alloy. In an embodiment, since the terminal region 122 is integrally formed with the cap plate 151, the cap plate 151 and the case 140, which will be described below, may have a same polarity as the first terminal 120 (e.g., a positive polarity). Accordingly, the first terminal 120 may serve as a positive terminal.

The second terminal 130 is also made of a metal and is electrically connected to the second electrode uncoated portion 112a of the second electrode plate 112. The second terminal 130 includes a second collector plate 131, a terminal pillar 132, and the terminal plate 133. Here, the terminal pillar 132 is electrically/mechanically connected between the second collector plate 131 and the terminal plate 133.

The second collector plate 131 has a side brought into contact with and welded to the second electrode uncoated portion 112a of the second electrode plate 112. In an embodiment, the second collector plate 131 may have a terminal hole 131a provided at another side, the terminal hole 131a passing through top and bottom surfaces of the second collector plate 131, and the terminal pillar 132 is inserted into the terminal hole 131a to then be riveted or welded. In an embodiment, the second collector plate 131 includes at least one bent portion between the sides to be configured to have a stepped portion. Here, the side of the second collector plate 131, which is brought into contact with the second electrode uncoated portion 112a, may be positioned lower than the side of the second collector plate 131 having the terminal hole 131a. In an embodiment, the second collector plate 131 may be made of copper or a copper alloy, but the material of the second collector plate 131 is not limited thereto.

The terminal pillar 132 passes through the cap plate 151, which will later be described, and upwardly protrudes and extends by a length (e.g., a predetermined length) to be electrically connected to the second collector plate 131 under the cap plate 151. In addition, while the terminal pillar 132 upwardly protrudes and extends by a length (e.g., a predetermined length) from the cap plate 151, a lower region of the terminal pillar 132 is inserted into the terminal hole 131a of the second collector plate 131 to then be riveted or welded. Here, the terminal pillar 132 is electrically insulated from the cap plate 151. The terminal pillar 132 may pass through the cap plate 151 and may be made of, for example, copper, a copper alloy, nickel, a nickel alloy, aluminum, or an aluminum alloy.

The terminal plate 133 may have a hole 133a passing through its top and bottom surfaces, and the terminal pillar 132 is engaged with the hole 133a to be welded. The terminal plate 133 may be coupled to the terminal pillar 132 on the cap plate 151. In an embodiment, a top surface of the terminal pillar 132 coupled to the terminal plate 133 may be positioned lower than the top surface of the terminal plate 133. Therefore, the terminal plate 133 may have a position identification groove located to correspond to the hole 133a on the terminal pillar 132. The position identification groove of the terminal plate 133 may be symmetrically positioned with the position identification groove 122a of the terminal region 122 in view of a lengthwise direction (y) and a widthwise direction (x) of the cap plate 151. In an embodiment, the terminal plate 133 may be made of aluminum or an aluminum alloy. In addition, for example, laser beams may be supplied to boundary regions of the upwardly exposed terminal pillar 132 and the terminal plate 133, such that the boundary regions are melted, followed by cooling and welding. In FIG. 2, the welded regions are designated by reference numeral 134.

As described above, in an embodiment, since the terminal plate 133 is made of aluminum or an aluminum alloy, it may be easily welded to a bus bar (not shown) made of aluminum or an aluminum alloy.

The case 140 is made of a conductive metal, such as aluminum, an aluminum alloy, or nickel-plated steel, and may have an approximately hexahedral shape with the opening 141 such that the electrode assembly 110 can be inserted and placed in the case 140. In FIG. 2, the case 140 and the cap assembly 150 are assembled with each other, and the opening 141 of the case 140 may be a peripheral portion coupled to the cap assembly 150. In an embodiment, the interior surface of the case 140 may be insulated, such that the case 140 is insulated from the electrode assembly 110, the first terminal 120, the second terminal 130, and the cap assembly 150.

The cap assembly 150 is coupled to the case 140. In an embodiment, the cap assembly 150 includes the cap plate 151, a seal gasket 152, a plug 153, a safety vent 154, an upper insulation member 155, and a lower insulation member 156.

The cap plate 151 may seal the opening of the case 140 and may be made of a same material as the case 140. The cap plate 151 may be coupled to the case 140 by, for example, laser welding. In an embodiment, the cap plate 151 may be integrally formed with the terminal region 122, as described above, and may have a same polarity as the first terminal 120. In addition, the case 140 welded to the cap plate 151 may also have the same polarity as the first terminal 120. In an embodiment, since the first terminal 120 is integrally formed with the cap plate 151, the first terminal 120 may be regarded as a component of the cap plate 151.

The seal gasket 152 made of an insulating material is positioned between the terminal pillar 132 and the cap plate 151. The seal gasket 152 may prevent or substantially prevent external moisture from infiltrating into the secondary battery 100 or the electrolyte accommodated within the secondary battery 100 from flowing out from the secondary battery 100.

The plug 153 seals an electrolyte injection hole 151a of the cap plate 151, and the safety vent 154 is installed in a vent hole 151b of the cap plate 151. A notch 154a is located in the safety vent 154 to be configured to be opened at a preset pressure.

The upper insulation member 155 is located between the terminal pillar 132 and the cap plate 151 and between the terminal plate 133 and the cap plate 151. In addition, the upper insulation member 155 comes into close contact with the cap plate 151, the terminal plate 133 and the terminal pillar 132. In addition, the upper insulation member 155 may also come into close contact with the seal gasket 152. The upper insulation member 155 insulates the terminal pillar 132 and the cap plate 151 from each other and insulates the terminal plate 133 and the cap plate 151 from each other.

The lower insulation member 156 is located between the second collector plate 131 and the cap plate 151 and insulates the second collector plate 131 and the cap plate 151 from each other. That is, the lower insulation member 156 prevents or substantially prevents an electrical short from occurring between the second collector plate 131 and the cap plate 151.

Figure 5:
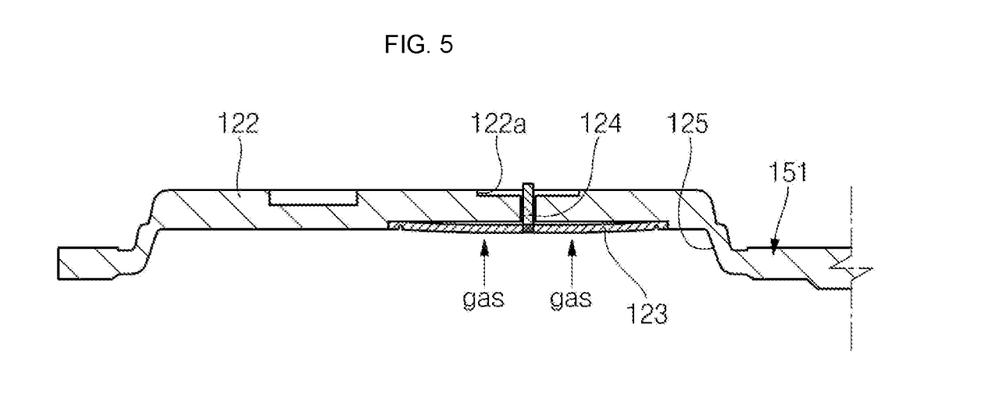
FIG. 5 is an enlarged cross-sectional view illustrating an operating state of a membrane depending on the internal pressure of the secondary battery shown in FIG. 2.

FIG. 5 is an enlarged cross-sectional view illustrating an operating state of the membrane of the first terminal 120 depending on the internal pressure of the secondary battery 100 shown in FIG. 2.

If the internal pressure of the secondary battery 100 is increased, the membrane 123 is brought into close contact with the bottom surface of the terminal region 122 by gases released from the secondary battery 100, thereby allowing the pressure indicator pin 124 to upwardly protrude from the top surface of the terminal region 122.

In the secondary battery 100, in an embodiment, since the pressure indicator pin 124 has a high-visibility color, the internal pressure of the secondary battery 100 can be easily visually identified. In addition, the secondary battery 100 can identify whether or not the internal pressure is increased according to whether or not the pressure indicator pin 124 protrudes.

For example, if the internal pressure is increased to exceed a reference pressure during charging and discharging processes prior to shipment of the secondary battery 100, the pressure indicator pin 124 protrudes to an upper portion of the terminal region 122, thereby visually identifying abnormality of the secondary battery 100. Here, the internal pressure of the secondary battery 100 may be reduced by replacing the plug 153 provided in the cap assembly 150. In addition, even after shipment of the secondary battery 100, a user can visually check whether the internal pressure is in an abnormal state or not.

Figure 6:
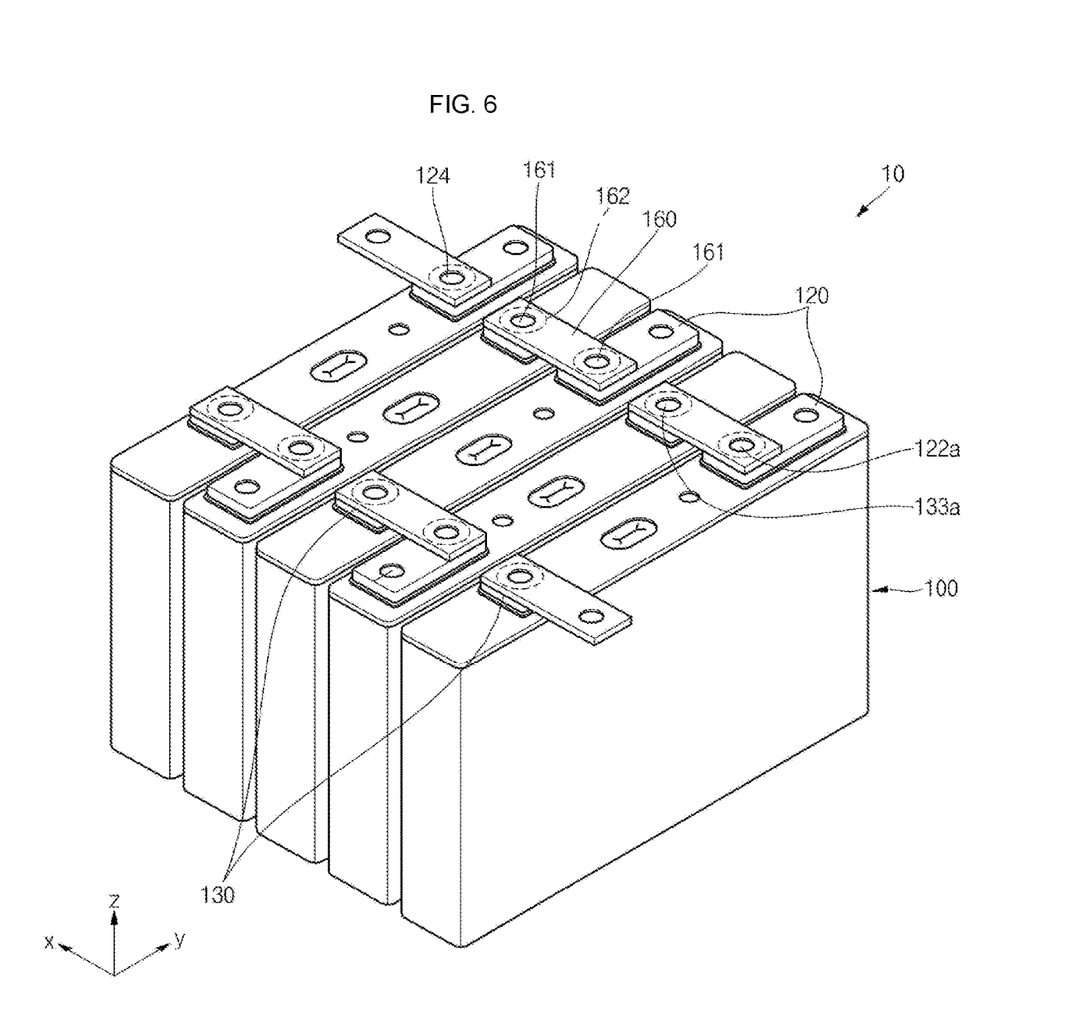
FIG. 6 is a perspective view illustrating a battery module including the secondary battery of FIG. 1, according to an embodiment of the present invention.

FIG. 6 is a perspective view illustrating a battery module 10 including the secondary battery 100, according to an embodiment of the present invention.

As shown in FIG. 6, multiple secondary batteries 100 are aligned and multiple bus bars 160 are coupled to the aligned secondary batteries 100, thereby forming the battery module 10. For example, a first terminal (e.g., a positive electrode terminal) 120 of one among the multiple secondary batteries 100, and a second terminal (e.g., a negative electrode terminal) 130 of another secondary battery 100 adjacent to the one secondary battery 100 may be welded to each other using the bus bar 160, thereby providing the battery module 10 having the multiple secondary batteries 100 connected to one another in series.

In an embodiment, the bus bar 160 may include two through holes 161 passing through top and bottom surfaces. The through holes 161 may be shaped to correspond to the position identification groove 122a, but aspects of the present invention are not limited thereto. In an embodiment, the through holes 161 may be circular. The position of the position identification groove 122a may be identified through the through holes 161 to identify a position where the bus bar 160 is to be welded. In an embodiment, the position identification groove 122a in the terminal region 122 of the first terminal 120 or the position identification groove at the hole 133a of the terminal plate 133 of the second terminal 130 may be exposed through the through holes 161 of the bus bar 160. For example, since the bus bar 160 includes two through holes 161, the welded position of the bus bar 160 may be identified through the position identification groove 122a of the terminal region 122 when the terminal region 122 is larger than the terminal plate 133 in the lengthwise direction (y). In addition, the upper portion of the pressure indicator pin 124 may also be exposed through the through holes 161 of the bus bar 160. Therefore, the battery module 10 can visually identify whether the internal pressure of one of the multiple secondary batteries 100 is abnormally increased.

In an embodiment, the bus bar 160 is made of aluminum or an aluminum alloy, and the terminal region 122 of the first terminal 120 and the terminal plate 133 of the second terminal 130 are also made of aluminum or an aluminum alloy, thereby allowing the bus bar 160 to be easily welded to the first terminal 120 and/or the second terminal 130. In addition, multiple bus bars 160 may be coplanarly positioned in the widthwise direction (x).

Figure 7:
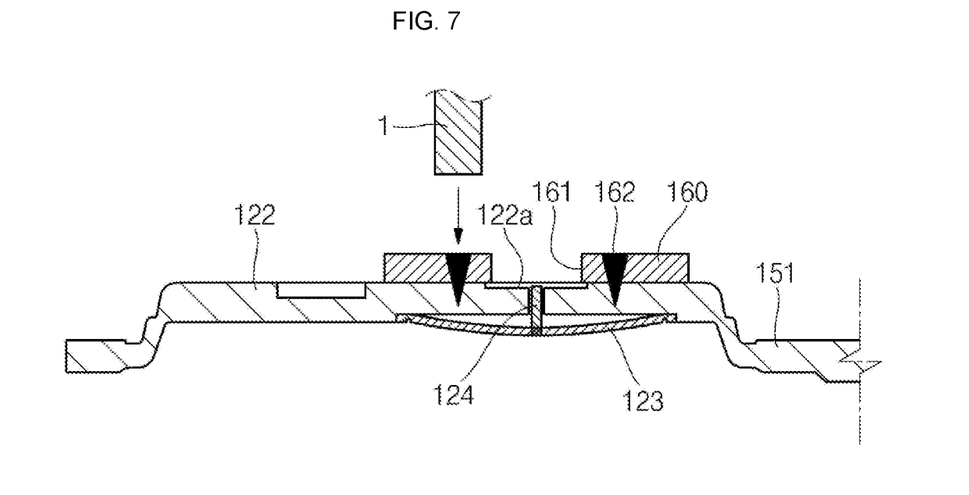
FIG. 7 is a cross-sectional view illustrating a state in which a bus bar is welded to a positive electrode terminal in the secondary battery of FIG. 1, according to an embodiment of the present invention.

FIG. 7 is a cross-sectional view illustrating a state in which a bus bar 160 is welded to the terminal region 122 of the first terminal 120 in the secondary battery 100, according to an embodiment of the present invention.

As shown in FIG. 7, according to an embodiment of the present invention, the bus bar 160 may be welded to the terminal region 122 of the first terminal 120 using a laser beam irradiated from a laser tool 1. Here, melting regions 162 are integrally formed with the bus bar 160 and the first terminal 120. If depths of the melting regions 162 are greater than the thickness of the terminal region 122, a through hole may be created in the terminal region 122, and a welding failure may be generated due to the presence of the through hole. However, in an embodiment of the present invention, even if the depths of the melting regions 162 are reduced, the bus bar 160 and the first terminal 120 may be welded to each other without a failure by forming multiple melting regions 162 along edges of the through holes 161. In an embodiment, the melting regions 162 may be spaced by a distance (e.g., a predetermined distance) apart from the through holes 161 and may be circular when planarly viewed. Therefore, even if the terminal region 122 is made to have the same thickness as the cap plate 151, the melting regions 162 may pass through the terminal region 122 to prevent or substantially prevent the internal structure of the terminal region 122 from being damaged.

Figure 8:
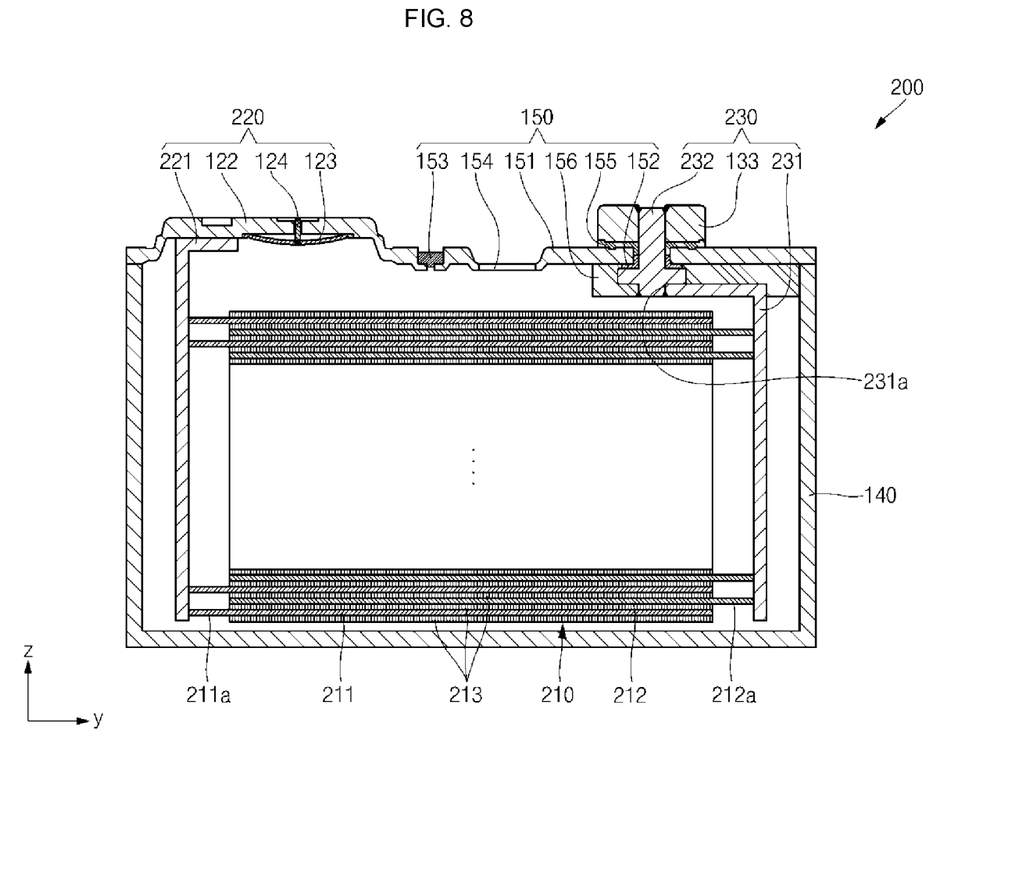
FIG. 8 is a cross-sectional view of a secondary battery according to another embodiment of the present invention.

FIG. 8 is a cross-sectional view of a secondary battery 200 according to another embodiment of the present invention.

The secondary battery 200 according to another embodiment of the present invention is different from the secondary battery 100 described above in view of connection relationships between the electrode assembly 210 and terminals 220 and 230. That is, the secondary battery 200 according to another embodiment of the present invention is the same as or similar to the secondary battery 100 described above, in view of the configuration of the terminal region 122, which is integrally formed with the cap plate 151. Therefore, the following description of the secondary battery 200 according to another embodiment of the present invention will focus on components different from those of the secondary battery 100, that is, an electrode assembly 210, a first collector plate 221 of a first terminal 220, and a second collector plate 231 of a second terminal 230.

The electrode assembly 210 is formed by winding or stacking a stacked structure including a first electrode plate 211, a separator 213, and a second electrode plate 212, which are shaped of thin plates or layers. In an embodiment, the first electrode plate 211 may serve as a positive electrode, and the second electrode plate 212 may serve as a negative electrode. In another embodiment, polarities of the first electrode plate 211 and the second electrode plate 212 may be reversed.

The first electrode plate 211 is formed by coating a first electrode active material, such as a transition metal oxide, on a first electrode collector made of a metal foil, such as aluminum, and includes a first electrode uncoated portion 211a on which the first electrode active material is not coated. The first electrode uncoated portion 211a may function as a current flow passage between the first electrode plate 211 and the outside of the first electrode plate 211. The first electrode uncoated portion 211a may be provided at a side of the electrode assembly 210 in a lengthwise direction (y). However, the material of the first electrode plate 211 is not limited to those listed herein.

The second electrode plate 212 is formed by coating a second electrode active material, such as graphite or carbon, on a second electrode collector made of a metal foil, such as copper or nickel, and includes a second electrode uncoated portion 212a on which the second electrode active material is not coated. The second electrode uncoated portion 212a may function as a current flow passage between the second electrode plate 212 and the outside of the second electrode plate 212. The second electrode uncoated portion 212a may be provided at another side of the electrode assembly 210 in the lengthwise direction (y). However, the material of the second electrode plate 212 is not limited to those listed herein.

The separator 213 may prevent or substantially prevent an electric short between the first electrode plate 211 and the second electrode plate 212 and may allow lithium ions to move. The separator 213 may be made of, for example, polyethylene (PE), polypropylene (PP), or a composite film of polyethylene (PE) and polypropylene (PP). However, the material of the separator 213 is not limited to those listed herein.

The first collector plate 221 and the second collector plate 231 are electrically connected to the first electrode uncoated portion 211a and the second electrode uncoated portion 212a provided at opposite ends of the electrode assembly 210, respectively.

In an embodiment, the first collector plate 221 is welded to the first electrode uncoated portion 211a protruding at an end of the electrode assembly 210. The first collector plate 221 may include a first region that is welded to the first electrode uncoated portion 211a and extends in a vertical direction (z), and a second region that is bent from an end of the first region in a direction substantially perpendicular to the first region to extend in the lengthwise direction (y) of the cap plate 151 and is welded to a bottom surface of the terminal region 122.

The second collector plate 231 is welded to the second electrode uncoated portion 212a protruding at another end of the electrode assembly 210. The second collector plate 231 may include a first region that is welded to the second electrode uncoated portion 212a and extends in the vertical direction (z), and a second region that is substantially vertically bent from an end of the first region to extend in the lengthwise direction (y) of the cap plate 151. In an embodiment, a coupling hole 231a passing through top and bottom surfaces of the second collector plate 231 may be provided in the second region of the second collector plate 231, and may be coupled and welded to a coupling protrusion of a terminal pillar 232 of the second terminal 230.

While the secondary battery of the present invention has been particularly shown and described with reference to some example embodiments thereof, it is to be understood by those of ordinary skill in the art that various changes in form and details may be made therein without departing from the spirit and scope of the present invention as set forth by the following claims.

What is claimed is:

1. A secondary battery comprising:
   a case comprising an internal receiving space and having an opening;
   an electrode assembly accommodated in the internal receiving space of the case;
   a cap plate coupled to the opening of the case; and
   a terminal coupled to the cap plate and electrically connected to the electrode assembly;
   wherein the terminal comprises a terminal region integrally formed with the cap plate, a membrane on a bottom surface of the terminal region and being downwardly convex, and a pressure indicator pin on a top surface of the membrane.

2. The secondary battery of claim 1, wherein a cavity is located at a lower portion of the terminal region, the membrane and the pressure indicator pin are arranged in the cavity, and the membrane includes a downwardly convex round part, and an edge part located along an outer periphery of the round part and fixed to a bottom surface of the terminal region in the cavity.

3. The secondary battery of claim 2, wherein the round part of the membrane is configured to come into contact with the bottom surface of the terminal region to allow the pressure indicator pin to protrude to a top surface of the terminal region when the internal pressure of the case is increased.

4. The secondary battery of claim 1, wherein the pressure indicator pin is vertically mounted at a center of the membrane and is shaped as a vertically extending pin having a thickness.

5. The secondary battery of claim 1, wherein the pressure indicator pin comprises a top end passing through the terminal region to be outwardly exposed.

6. The secondary battery of claim 1, wherein the pressure indicator pin comprises a surface having a color that is different from a color of the cap plate to have high visibility.

7. The secondary battery of claim 1, wherein the cap plate has a thickness from approximately 1.5 mm to approximately 2.5 mm, and the terminal region has a thickness from approximately 2 mm to approximately 2.5 mm.

8. The secondary battery of claim 1, wherein the terminal region has a thickness equal to or greater than a thickness of the cap plate.

9. The secondary battery of claim 8, wherein a thickness difference between the terminal region and the cap plate is less than 0.5 mm.

10. The secondary battery of claim 1, wherein the terminal further comprises a collector plate electrically connecting the electrode assembly and the bottom surface of the terminal region, the collector plate is mounted on a side of the bottom surface of the terminal region, and the membrane is mounted on another side of the bottom surface of the terminal region.

11. The secondary battery of claim 1, wherein the terminal region comprises a position identification groove extending downwardly from a top surface of the terminal region, and the pressure indicator pin is exposed through a center of the position identification groove.

* * * * *